Patented June 11, 1946

2,401,749

UNITED STATES PATENT OFFICE 2,401,749

MANUFACTURE OF PENTAERYTHRITOL

Raymond F. Burghardt, Forest Hills, N. Y., and Robert H. Barth, Ridgewood, N. J., assignors, by mesne assignments, to Heyden Chemical Corporation, New York, N. Y., a corporation of Delaware No Drawing. Application May 12, 1942, Serial No. 442,620

2 Claims. (Cl. 260—615)

This invention relates to the manufacture of pentaerythritol and polypentaerythritols by the reaction of acetaldehyde and formaldehyde in the presence of an alkali, and involves certain improvements whereby certain advantages, including increased yield, are obtained.

It is well known that pentaerythritol and polypentaerythritols are formed by the reaction of 4 to 5 molecules of formaldehyde with 1 molecule of acetaldehyde in the presence of 1 to 1½ equivalents of alkali. Alkalies which have been suggested are the hydroxides of sodium, calcium, potassium and barium, as well as certain carbonates, such as those of sodium and potassium. In commercial practice the alkalies most commonly used are sodium hydroxide and calcium hydroxide, although sodium hydroxide has not been used generally, since it has been considered too strong a condensing agent.

In the manufacture of pentaerythritol by the condensation of acetaldehyde and formaldehyde, there are also formed smaller amounts of other hydroxylated substances. One of these, which is obtained in a considerable amount, is dipentaerythritol, which is an ether having the following structure:

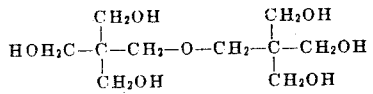

(See Brün, "Ueber den Dipentaerythrit," Wilhelm Greven, Krefeld, 1930). Another hydroxylated substance, obtained in somewhat smaller amounts, is white and crystalline, melts at 230 to 240° C., and has a hydroxyl content of 33%. The chemical structure of this substance is not known, and there is a possibility that it may be a mixture of chemical entities. It seems fairly certain, however, that it is related to dipentaerythritol in that it contains pentaerythritol residues bound by ether linkages. Regardless of chemical structure, for purposes of definition in this specification and in the claims, this substance will be termed "Pleopentaerythritol." The term is not intended to indicate that the substance is necessarily formed either actually or theoretically by combination of pentaerythritol residues, but merely signifies that it is a third product, probably similar to pentaerythritol and dipentaerythritol.

Dipentaerythritol and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with a polyhydric alcohol. These polypentaerythritols therefore have either the same number of hydroxyl groups as pentaerythritol (as for instance when an ether is formed from pentaerythritol and a glycol, or from pentaerythritol and ethylene oxide), or the polypentaerythritols may have a greater number of hydroxyl groups than pentaerythritol, that is to say, five or more (as for instance when an ether is formed from two or more molecules of pentaerythritol, or from pentaerythritol and glycerol, etc.).

The principal object of the present invention is to provide a process for the condensation of formaldehyde and acetaldehyde in the presence of an alkaline condensing agent such as sodium hydroxide to produce increased yields of pentaerythritol and polypentaerythritols. A further object of the invention is to provide such a process in which the condensation is effected rapidly and the cost of recovery of the desired products is reduced. A still further object of the invention is to provide a process in which the pentaerythritol produced may be separated readily from the polypentaerythritols, that is, a process in which the formation of byproducts is substantially avoided. Other objects and advantages of the invention, some of which are referred to specifically hereinafter, will be apparent to those skilled in the art to which the invention pertains.

In accordance with the improved process of the invention, acetaldehyde in substantially pure form, either as liquid or vapor, is added to an aqueous solution containing the alkaline condensing agent, preferably sodium hydroxide. The proportions which are used are approximately 1 molecular proportion of acetaldehyde to approximately 4½ molecular proportions of formaldehyde and 1½ equivalent proportions of alkali. The formaldehyde concentration of the aqueous solution to which the acetaldehyde is added is initially within the range of approximately 17 to 30 per cent by weight, which is substantially higher than that generally specified heretofore. The addition of acetaldehyde to the formaldehyde solution is made slowly and at such a rate that the temperature of the reaction mixture is maintained below approximately 30° C. and preferably between approximately 20° and approximately 30° C. External cooling may be used together with the controlled addition of the acetaldehyde in order to maintain the temperature of the reaction mixture below 30° C. After the specified amount of acetaldehyde has been added, the reaction mixture is maintained at a temperature within the range of approximately 20° to approximately 30° C. until the condensation reaction is substantially completed. The course of the reaction can be determined in conventional manner, for example, by determinations of the aldehyde concentration of the reaction mixture. The reaction mixture may be subsequently concentrated by evaporation and the pentaerythritol and polypentaerythritols recovered therefrom in a conventional manner or as more specifically described hereinafter.

The foregoing general process is based upon our discovery that control of all the foregoing factors within the specified ranges is required in order to attain the objects of the invention, which include high yields of products, rapid reaction, low yields or the substantial absence of byproducts among the desired reaction products, and low recovery costs.

The control of the reaction in the process of the present invention by slow addition of the acetaldehyde has certain advantages. In the first place, it virtually prevents the secondary reactions of acetaldehyde in the presence of sodium hydroxide to produce aldol and polymeric products and promotes the desired reaction with formaldehyde. In other words, it keeps the concentration of acetaldehyde in the reaction mixture containing sodium hydroxide and formaldehyde low at all times, thereby promoting its reaction with formaldehyde rather than with itself in accordance with these secondary reactions. In addition, it enables one to control the temperature.

Combined with this controlled slow addition of acetaldehyde, we employ the low temperature, controlled by the rate of addition of acetaldehyde and by external cooling, and the higher concentration of formaldehyde, for the purpose of increasing the yield of pentaerythritol and polypentaerythritols. By using the high concentration of formaldehyde, the evaporation cost is also reduced since less water must be removed in order to crystallize the product, and the separation of pentaerythritol and the polypentaerythritols is greatly facilitated. In the majority of prior art methods, 2 to 4 times as much water must be removed from the reaction mixture before crystallization as in our improved process.

The polypentaerythritols are removed from the reaction mixture simply by filtering the neutralized reaction liquor that is adjusted to a specific gravity of 1.100 at 25° C. The pentaerythritol, which is then crystallized out of the filtrate from the above filtration, is 90 to 95% pure pentaerythritol containing 5 to 10% dipentaerythritol. The usual pentaerythritol of commerce contains 15 to 20% of dipentaerythritol. The yield of total product, including pentaerythritol and polypentaerythritols, is 85 to 95%, as compared to 70 to 80% by prior art methods.

As above pointed out, liquid acetaldehyde or acetaldehyde vapor obtained by vaporization of liquid acetaldehyde may be used. We prefer to use liquid acetaldehyde since it is most convenient, and its use provides the most economical process. We prefer to cause the acetaldehyde to enter below the surface of the alkali solution containing the formaldehyde, in order to eliminate losses due to vaporization.

The following examples illustrate methods of practicing the process of our invention:

*Example I.*—To 1350 parts of a 20% formaldehyde solution (approximately 9 mols) was added 240 parts of 50% sodium hydroxide solution (approximately 3 mols), the temperature being maintained at 15° C. Eighty-eight (88) parts of liquid acetaldehyde (approximately 2 mols) was added slowly under the surface of the formaldehyde-sodium hydroxide solution during the course of 1 hour, and at a rate such as to hold the temperature between 20 and 25° C., the reaction vessel being immersed in an ice-water bath during the reaction. When the acetaldehyde had all been added, the reaction mixture was held at 25° C. for 3 to 4 hours. It was then heated to 60° C. for 1 to 2 hours, during which heating the aldehyde content was lowered to less than 0.1%.

The polypentaerythritols had started to crystallize by this time. The pH was adjusted to 7.8 to 8.0 with formic acid, and the mixture was cooled to 25° C., and the specific gravity was adjusted to 1.100. It was then filtered. The filtrate was evaporated to a specific gravity of 1.270 and chilled to crystallize out the pentaerythritol. The yield of pentaerythritol plus polypentaerythritols obtained in this way was 90% of the theoretical yield based on the acetaldehyde charged.

*Example II.*—To 900 parts of a 30% formaldehyde solution (approximately 9 mols) was added 240 parts of 50% sodium hydroxide solution (approximately 3 mols), the temperature being maintained at 15° C. Eighty-eight (88) parts of liquid acetaldehyde (approximately 2 mols) was added under the surface of the formaldehyde-sodium hydroxide solution over a period of 1 hour, and at a rate such as to hold the temperature at 25° C., the reaction vessel being immersed in an ice-water bath during the reaction. When the acetaldehyde had all been added the reaction mixture was held at 25° C. for 3 hours. It was then heated to 60° C. for 1½ hours, during which time the aldehyde content was lowered to 0.1%.

The liquor was treated then as was that resulting in Example I. The yield of total products, a mixture of pentaerythritol and polypentaerythritols, was 86% of the theoretical yield based on the acetaldehyde charged.

*Example III.*—The procedure outlined in Example I was repeated, but the temperature of the reaction mixture was kept at 15° C. during the addition of the acetaldehyde, and in this case the yield was 86% of the theoretical yield based on the acetaldehyde charged.

*Example IV.*—To 1350 parts of a 20% formaldehyde solution (approximately 9 mols) was added 240 parts of 50% sodium hydroxide solution (approximately 3 mols), the addition being made at such a rate that the temperature was maintained at 15° C. Eighty-eight (88) parts of acetaldehyde (approximately 2 mols) was slowly charged in vapor form under the surface of the formaldehyde-sodium hydroxide mixture over a period of 35 minutes, and at a rate such as to maintain a temperature range between 6 and 22° C., the reaction vessel being immersed in an ice-water bath during the addition. When the acetaldehyde had all been added, the reaction mixture was held at 25° C. for 3 to 4 hours. It was then heated to 60° C. for 1 to 2 hours, during which heating the aldehyde content was lowered to less than 0.1%. It was then treated as in Example I. The yield of pentaerythritol plus polypentaerythritols obtained in this way was 88% of the theoretical yield based on the acetaldehyde charged.

*Example V.*—To 900 parts of a 30% formaldehyde solution (approximately 9 mols) was added 88 parts of liquid acetaldehyde (approximately 2 mols) at a temperature of 10° C. This solution was added slowly over a period of 2 hours to 480 parts of a 25% sodium hydoxide solution (approximately 3 mols) at 25° C., the reaction vessel being surrounded by an ice bath. The charge was held at 25° C. for 4 hours, and then heated to 60° C. for 1 hour until the aldehyde content was reduced to 0.1%. It was then treated as in Example I. The yield was 93% of the theoretical yield based on the acetaldehyde charged and the solid products were a mixture of pentaerythritol and polypentaerythritols.

*Example VI.*—To 827 parts of a 20% formaldehyde solution (approximately 5.51 mols) mixed with 480 parts of 50% caustic soda solution (approximately 6 mols of sodium hydroxide) and 480 parts of water were added a mixture of 1654 parts of a 20% formaldehyde solution (approximately 11.03 mols) and 178 parts of acetaldehyde (approximately 4.05 mols) at a rate which made it possible to hold the temperature at 20° C. This addition required 90 minutes. The reaction product was treated in exactly the same way as that of Example I. The yield of total solid products was 88% of the theoretical yield based on the acetaldehyde charged.

In accordance with the process of the present invention, the formaldehyde solution into which is charged the acetaldehyde in substantially pure form has an initial concentration of formaldehyde within the range of approximately 17% to approximately 30% formaldehyde (HCHO) by weight. During the addition of the acetaldehyde the reaction mixture is maintained below approximately 30° C. and preferably within the range of approximately 20° to approximately 30° C. It is possible to maintain the reaction temperature below 30° C. without the aid of external cooling means by precooling the acetaldehyde and the formaldehyde solution to approximately 5° C. and then to add the precooled acetaldehyde to the precooled formaldehyde solution at such a slow rate as not to exceed approximately 30° C. However, we prefer to maintain the temperature of the reaction mixture during the addition of the acetaldehyde below approximately 30° C. by external cooling means. The acetaldehyde may be added over a short interval of approximately 10 minutes by cooling the reaction mixture very rapidly or it may be added over an interval of from 1 to 3 hours with less-rapid cooling. We prefer to use a period of about 1 to 3 hours for the addition of the acetaldehyde, dependent upon the size of the charge. By using reactants having the concentrations within the limits specified herein, the specific gravity of the reaction mixture at 25° C. is kept between approximately 1.09 and approximately 1.12, and the water content is low, resulting in correspondingly low evaporation costs.

Inasmuch as the foregoing specification comprises preferred embodiments of the invention it is to be understood that the invention is not limited thereto and that variations and modifications may be made therein in accordance with the principles set forth herein without departing substantially from its scope.

Having thus described our invention, what we claim as new and desire to secure by Letters Patent is:

1. A process for the production of pentaerythritol and polypentaerythritols by the condensation of formaldehyde and acetaldehyde in the presence of sodium hydroxide, which comprises adding slowly approximately 1 molecular proportion of acetaldehyde in substantially pure form to an aqueous solution comprising sodium hydroxide and approximately 4½ molecular proportions of formaldehyde, which solution has an initial formaldehyde concentration within the range of approximately 17 to approximately 30 per cent by weight, maintaining the temperature below approximately 30° C. during the addition of the acetaldehyde and, after addition of all the acetaldehyde, maintaining the reaction mixture at a temperature within the range of approximately 20° to approximately 30° C. for such period of time that the condensation reaction is substantially completed but unconverted formaldehyde still remains in the reaction mixture, subsequently heating said reaction mixture at approximately 60° C. for such period that the aldehyde content is reduced to approximately 0.1%, and recovering pentaerylthritol and polypentaerythritols from the resulting reaction mixture.

2. A process for the production of pentaerythritol and polypentaerythritols by the condensation of formaldehyde and acetaldehyde in the presence of sodium hydroxide, which comprises adding slowly approximately 1 molecular proportion of acetaldehyde in substantially pure form to an aqueous solution comprising approximately 1½ molecular proportions of sodium hydroxide and approximately 4½ molecular proportions of formaldehyde, which solution has an initial formaldehyde concentration within the range of approximately 17 to approximately 30 per cent by weight, maintaining the temperature between approximately 20° C. and approximately 30° C. during the addition of the acetaldehyde and, after addition of all the acetaldehyde, maintaining the reaction mixture at a temperature within the range of approximately 20° to approximately 30° C. for such period of time that the condensation reaction is substantially completed but unconverted formaldehyde still remains in the reaction mixture, subsequently heating said reaction mixture at approximately 60° C. for such period that the aldehyde content is reduced to approximately 0.1%, and recovering pentaerythritol and polypentaerythritols from the resulting reaction mixture.

RAYMOND F. BURGHARDT.
ROBERT H. BARTH.